United States Patent [19]
Poulos et al.

[11] 4,291,005
[45] Sep. 22, 1981

[54] SETTLING OUT SUSPENDED SOLIDS IN PHOSPHORIC ACID PRODUCT SOLUTIONS

[75] Inventors: Andrew C. Poulos; Michael J. Thibodeau, both of Lakeland, Fla.

[73] Assignee: American Cyanamid Company, Stamford, Conn.

[21] Appl. No.: 32,594

[22] Filed: Apr. 23, 1979

[51] Int. Cl.³ .............................................. C01B 25/16
[52] U.S. Cl. ................................ 423/321 R; 423/320; 210/733; 210/734
[58] Field of Search ........................... 423/320, 321 R; 210/733, 734

[56] References Cited

U.S. PATENT DOCUMENTS 3,928,551  12/1975  Booth .............................. 423/320 X

FOREIGN PATENT DOCUMENTS 1020015  2/1966  United Kingdom ............ 423/321 R

Primary Examiner—O. R. Vertiz
Assistant Examiner—Gregory A. Heller
Attorney, Agent, or Firm—Gordon L. Hart

[57] ABSTRACT

For settling suspended solids in phosphoric acid product solutions, a copolymer of 95 mole percent ammonium acrylate monomer, 5% acrylamide monomer is shown to remove more solids than prior art flocculants when used in equivalent dosage, and to remove equivalent solids at much less dosage.

4 Claims, No Drawings

SETTLING OUT SUSPENDED SOLIDS IN PHOSPHORIC ACID PRODUCT SOLUTIONS

The invention relates to improvements in the manufacture of phosphoric acid from phosphate ores.

After phosphate ore has been mined and refined by conventional ore benefication processes, the refined ore is phosphate rock consisting mostly of particulate phosphates of magnesium, calcium and the like with some organic as well as inorganic impurities. This refined ore is dissolved by hot (140°–150° C.) concentrated sulfuric acid to make a phosphoric acid solution of about 28% phosphoric acid. Insoluble solids, consisting mostly of sulfates of calcium and magnesium, are precipitated and removed and the solution is clarified by use of a flocculant to bring down fine particulate solids which have remained in suspension. Conventional organic flocculants for this use have been nonionic acrylamide homopolymer and anionic copolymers of about 1 to about 35 mole percent ammonium acrylate monomer and the remainder of acrylamide. The copolymers for this use in accordance with the invention are homopolymers of acrylic acid or copolymers consisting of a predominant proportion of acrylic acid or acrylate monomer and a minor proportion of acrylamide monomer, preferably having molecular weight in the range about 9–15 million.

The 28% phosphoric acid product solution may be concentrated by evaporation, which improves the phosphoric acid purity by precipitation of additional calcium and magnesium sulfates. By a single evaporation of the 28% solution, a 40% phosphoric acid solution is produced and the 40% acid concentrate is again clarified by the use of flocculants of the same kind. The clarified 40% $H_3PO_4$ product may be sold or may be concentrated again by evaporation to make a 54% phosphoric acid solution which is again clarified by use of an organic flocculant.

We have now found, in the manufacture of phosphoric acid as described, that the removal of solids by flocculation is improved by the use of a particular class of organic homopolymers and copolymer which have not been previously used for this purpose. By comparision with conventional flocculants known for this use, this new flocculant for this use is found to remove more of the solids in suspension when used in dosage equal to the previous polymer dosages, and when used in lesser dosage is found to remove as much or more solids than the previously used copolymers at usual dosages. The preferred copolymer that is now found useful in acid clarification was designed for its known use in the clarification of digested bauxite ore solutions, which have high alkaline pH. In the present invention, the solution treated is a strong acid solution having low pH. Copolymers of acrylamide with proportions of acrylic comonomer up to about 35% had been used for phosphoric acid clarification but were not significantly better in overall performance than the acrylamide homopolymers. It was therefore unexpected to find that the copolymer in which the ammonium acrylate monomer predominates would be a better flocculant for use in phosphoric acid clarification.

The advantages of the invention are demonstrated by comparison of the 95-05 ammonium acrylate-acrylamide copolymer with three of the conventional polymeric flocculants in comparative phosphoric acid clarification tests.

EXAMPLE 1

A sample of crude 28% by wt phosphoric acid aqueous solution, which has been prepared by dissolving phosphate rock in sulfuric acid prior to treatment with flocculants, contains calcium equivalent to 0.68 wt percent CaO and contains 1.86 wt percent total solid as determined by analysis.

A second sample of 40% by wt phosphoric acid aqueous solution as taken from an evaporator in which a finished 28% solution has been concentrated to 40% by wt phosphoric acid, contains calcium equivalent to 1.33 wt percent CaO and contains 8.0 wt percent total solids as determined by analysis.

A third sample of another 40% by wt phosphoric aqueous solution, as taken from an evaporator in which a finished 28% solution has been concentrated to 40% by wt phosphoric acid, contains calcium equivalent 1.32% CaO and contains 5.15% total solids, as determined by analysis.

Each of the three samples is divided to make four 500 ml aliquots. Four flocculants to be tested are dispersed in water for ease of addition in the treatment of the phosphoric acid aliquots. The flocculants to be tested are:

Flocculant I.
  A copolymer of 95 mole percent ammonium acrylate monomer and 5 mole percent acrylamide copolymerized to molecular weight in the range about 9 to 15 million.

Flocculant II.
  A copolymer of 30 mole percent ammonium acrylate and 70 mole percent acrylamide copolymerized to molecular weight in the range about 9 to 15 million.

Flocculant III.
  A commercially obtained copolymer which is virtually identical chemically to the copolymer described at II above.

Flocculant IV.
  Acrylamide homopolymer of molecular weight in the range from 9 to 15 million.

To one of the aliquots taken from each of the three samples, are added amounts of Flocculant I to make eight ppm of the copolymer in the first sample a 28% phosphoric acid solution, to make 30 ppm of copolymer in the second sample, a 40% solution, and to make 16 ppm of the polymer in the third sample, another 40% solution. This is repeated using each of the Flocculants II, III and IV described above, with aliquots from each of the three samples. The polymers are added and mixed with each 500 ml of solution. Each aliquot is then poured into a graduate cylinder and allowed to stand for 15–30 minutes to permit flocculation and settling of the solids.

At the end of the 15–30 minute settling period, a sample of 50–100 ml of solution is taken from the top of each cylinder and analyzed to determine residual solids content in the sample. The total solids content is separated and weighed and the result is expressed in the tables below as percent by weight total solids in the solution. The total solids are further analyzed for calcium and the calcium content found is expressed in the tables below as percent by weight of CaO in the solution.

In addition to the results shown in the tables, a noticeably better improvement in color clarification was observed in samples treated with Flocculant I by comparison with the color of solutions after treatment with the other flocculants tested. This indicates better removal of organic impurities by Flocculant I. Quantitative measurements were not made for color improvement, but the improvement noticed was striking. The Flocculant I similarly shows improvements in the treatment of 54% $H_3PO_4$ solutions, comparable with those shown in the tables.

TABLE I

| Flocculant | 28% Acid Clarification 15 Min. Settling Time 8 ppm Flocculant | |
|---|---|---|
| | % Ca as CaO | Total % Solids |
| I | .35 | .33 |
| IV | .41 | .69 |
| II | .40 | .54 |
| III | .48 | .79 |

TABLE II

| Flocculant | 40% Acid Clarification 30 Min. Settling Time 30 ppm Flocculant | |
|---|---|---|
| | % Ca as CaO | Total & Solids |
| I | .07 | .16 |
| II | .10 | .21 |
| II | .09 | .29 |
| IV | .10 | .17 |
| III | .12 | .36 |

TABLE III

| Flocculant | 40% Acid Clarification 30 Min. Settling Time 16 ppm Flocculant | |
|---|---|---|
| | % Ca as CaO | Total & Solids |
| I | .14 | .27 |
| II | .19 | .49 |
| III | .23 | .60 |
| I (8 ppm Dosage) | .16 | .36 |

The tables demonstrate improved removal of solids by the use of Flocculant I on comparison with the use of any of the Flocculants II, III or IV, in equal dosages. Table III further shows that Flocculant I when used in dosage reduced by one-half still removed solids better than did the other flocculants at full dosage.

In the foregoing descriptions and examples the invention was described by reference to a preferred copolymer of ammonium acrylate and acrylamide. The fact that the ammonium salt was used is not important to the invention and the invention can be practiced as well with other polymers in which the acrylic members of the polymer are acrylic acid or other acrylate salts such as acrylates of sodium potassium, and the like, or are in the acrylic acid form. In the strong acid solutions being treated, the salts when added to the acid solution are changed to the acrylic acid form in any case.

In the foregoing examples the invention was described by reference to a 95-5 acrylate-acrylamide copolymer. The invention contemplates the use of acrylic or acrylate homopolymers and other acrylic acid or acrylate copolymers with acrylamide, in which the acrylic acid or acrylate moiety predominates, whenever such other polymers or copolymers effect superior results comparable with the results demonstrated by the examples. Other polymers of this class include, for example, acrylic acid homopolymers, ammonium acrylate homopolymers, 80 mole % acrylic acid, 10 mole % acrylamide copolymer, 90 mole % sodium acrylate, 10 mole % acrylamide copolymer, and the like. The preferred polymers for this use have molecular weight in the range from 9 to 15 million but the invention contemplates the use of homopolymers and copolymers, of the class described, having other molecular weight whenever such other polymers are equivalent in effectiveness for the use described.

We claim:

1. In the process for manufacture of phosphoric acid by dissolving phosphate rock in aqueous sulfuric acid solution and separating solids comprising insoluble sulfates from said solution by means comprising flocculation of suspended solids with an organic polymeric flocculating agent, the improvement wherein said flocculating agent is a copolymer consisting essentially of a predominant proportion of polymeric acrylic acid or acrylate units and a minor porportion of acrylamide units.

2. An improved process defined by claim 1 wherein the defined copolymer is a copolymer of 95 molepercent acrylic acid or acrylate and 5 mole percent acrylamide.

3. An improved process defined by claim 1 wherein the defined copolymer has molecular weight in the range about 9 million to 15 million.

4. An improved process defined by claim 1 wherein said process comprises a step of concentrating the aqueous solution by evaporation after the defined separation of insoluble solids therefrom, followed by flocculation of suspended solids from the concentrated solution by means of the flocculating agent.

* * * * *